United States Patent
Gunawan et al.

(10) Patent No.: US 10,412,490 B2
(45) Date of Patent: Sep. 10, 2019

(54) MULTITALKER OPTIMISED BEAMFORMING SYSTEM AND METHOD

(71) Applicant: DOLBY LABORATORIES LICENSING CORPORATION, San Francisco, CA (US)

(72) Inventors: David Gunawan, Sydney (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/078,563

(22) PCT Filed: Feb. 23, 2017

(86) PCT No.: PCT/US2017/019182
§ 371 (c)(1),
(2) Date: Aug. 21, 2018

(87) PCT Pub. No.: WO2017/147325
PCT Pub. Date: Aug. 31, 2017

(65) Prior Publication Data
US 2019/0058944 A1  Feb. 21, 2019

Related U.S. Application Data

(60) Provisional application No. 62/299,700, filed on Feb. 25, 2016.

(30) Foreign Application Priority Data

Feb. 25, 2016  (EP) ..................................... 16157358

(51) Int. Cl.
*H04R 3/00* (2006.01)
*H04M 3/56* (2006.01)
(Continued)

(52) U.S. Cl.
CPC ............ *H04R 3/005* (2013.01); *H04M 3/568* (2013.01); *H04R 1/406* (2013.01); *H04L 65/403* (2013.01);
(Continued)

(58) Field of Classification Search
CPC .. H04R 3/005; H04R 1/406; H04R 2201/401; H04L 65/403
See application file for complete search history.

(56) References Cited

U.S. PATENT DOCUMENTS 5,940,118 A  8/1999  Van Schyndel
7,970,150 B2  6/2011  Oxford
(Continued)

FOREIGN PATENT DOCUMENTS

JP  2013-179388  9/2013

OTHER PUBLICATIONS

Dickreiter, M., "Handbuch der Tonstudiotechnik- Bandl" Jan. 1, 1997, ISBN: 978-3-598-11320-8, Fig. 1/25, 1/26, 4/11., pp. 36-162.
(Continued)

*Primary Examiner* — Regina N Holder

(57) ABSTRACT

A method of processing a series of microphone inputs of an audio conference, the method including the steps of: (a) conducting a spatial analysis and feature extraction of the audio conference based on current audio activity; (b) aggregating historical information to obtain information about the approximate relative location of recent sound objects relative to the series of microphone inputs; (c) utilizing the relative location or distance of the sound objects from the series of microphone inputs to determine if beam forming should be utilized to enhance the audio reception from recent sound objects.

16 Claims, 8 Drawing Sheets

(51) Int. Cl.
*H04R 1/40* (2006.01)
*H04L 29/06* (2006.01)

(52) U.S. Cl.
CPC . *H04M 2203/509* (2013.01); *H04R 2201/401* (2013.01)

(56) References Cited

U.S. PATENT DOCUMENTS

| | | | |
|---|---|---|---|
| 7,970,151 | B2 | 6/2011 | Oxford |
| 8,396,574 | B2 | 3/2013 | Smithers |
| 8,503,653 | B2 | 8/2013 | Ahuja |
| 8,521,530 | B1 | 8/2013 | Every |
| 8,934,640 | B2 | 1/2015 | Goodwin |
| 9,349,384 | B2 | 5/2016 | Gunawan |
| 9,451,379 | B2 | 9/2016 | Gunawan |
| 9,979,829 | B2 | 5/2018 | Cartwright |
| 2009/0052684 | A1 | 2/2009 | Ishibashi |
| 2010/0278357 | A1 | 11/2010 | Hiroe |
| 2011/0038486 | A1 | 2/2011 | Beaucoup |
| 2012/0099732 | A1 | 4/2012 | Visser |
| 2012/0124603 | A1 | 5/2012 | Amada |
| 2013/0083934 | A1 | 4/2013 | Aahgren |
| 2013/0083943 | A1 | 4/2013 | Sorensen |
| 2013/0301837 | A1 | 11/2013 | Kim |
| 2014/0003611 | A1 | 1/2014 | Mohammad |
| 2014/0133665 | A1 | 5/2014 | Xiang |
| 2014/0226838 | A1 | 8/2014 | Wingate |
| 2014/0241528 | A1 | 8/2014 | Gunawan |
| 2014/0286497 | A1 | 9/2014 | Thyssen |
| 2014/0328487 | A1 | 11/2014 | Hiroe |
| 2014/0337016 | A1 | 11/2014 | Herbig |
| 2015/0086038 | A1 | 3/2015 | Stein |
| 2015/0139426 | A1 | 5/2015 | Tammi |
| 2016/0118038 | A1* | 4/2016 | Eaton .................... G10K 15/08 381/63 |

OTHER PUBLICATIONS

Anonymous: "Critical Distance and Microphone Placement", Shure Technical FAQ, Feb. 17, 2000, Retrieved from the internet, pp. 1-3.
Dickins, G. et al., "On the potential for scene analysis from compact microphone arrays", Proc. 52nd AES International conference on sound field control- engineering and perception, Sep. 2, 2013, pp. 1-10.
Brutti, A. et al., "Multiple source localization based on acoustic map de-emphasis", Jan. 10, located via Google Scholar, Published in: Journal EURASIP Journal on Audio, Speech, and Music Processing, vol. 2010, Jan. 2010, Article ID 147495, 17 Pages. Article No. 11 Hindawi Publishing Corp. New York, NY, United States.
McCowan, I., et al., "Speech Acquisition in Meetings With an Audio-Visual Sensor Array", located via Google Scholar, IDIAP Research Institute Rue de Simplon 4, CH-1920 Martigny, Switzerland, pp. 1-4.
Zhang, C., et al. "Maximum Likelihood Sound Source Localization and Beamforming for Directional Microphone Arrays in Distributed Meetings", Apr. 8, located via Google Scholar, IEEE Transactions on Multimedia, vol. 10, No. 3, pp. 538-548.
Clapp, S., "Investigations of Room Acoustics with a Spherical Microphone Array", Oct. 20-23, 2011, located via AES.org., AES131st Convention Program Rensselear Polytechnic Institute, Troy, NY, USA 2Arup, New York, NY, USA.

* cited by examiner

MULTITALKER OPTIMISED BEAMFORMING SYSTEM AND METHOD

CROSS-REFERENCE TO RELATED APPLICATIONS

This application claims priority to U.S. Provisional Patent Application No. 62/299,700, filed on Feb. 25, 2016 and EP Patent Application No. 16157358.9, filed on Feb. 25, 2016, each of which is incorporated herein by reference in its entirety.

FIELD OF THE INVENTION

The present invention relates to the monitoring of voice conferencing conversations with multiple talkers talking at various times, and, in particular, discloses the utilisation of beamforming to provide a more optimised audio conferencing experience.

BACKGROUND OF THE INVENTION

Any discussion of the background art throughout the specification should in no way be considered as an admission that such art is widely known or forms part of common general knowledge in the field.

In voice conferencing applications with multiple talkers talking around a single endpoint, the ability to capture the voice of an individual is important to the intelligibility and quality of the conferencing experience.

In an example arrangement, as illustrated in FIG. 1, an audio conference 1 is carried out, where a series (e.g., set) of participants 2, 3, 4 are positioned around a Conferencing Audio Input/Output Device 6. The Device 6 is interconnected to a networking environment 7 for the transmission of the audio conversation.

Typically, the conferencing audio input/output device 6 includes one or more microphones e.g. 9. Where multiple microphones (e.g., an array of microphones) are provided, there exists opportunities for improving the voice capture through beamforming or beamsteering of the microphones.

Beamforming is the process by which a signal or signals are captured by multiple microphones, and in order to capture the best quality signal for a given source or sound of interest, some linear combination of the microphones is selected in order to maximize the signal to noise ratio. Traditionally beamforming aims to optimize for a current talker. It virtually steers a directional beam towards the most salient talker at a particular instance in time in the hope that it will improve the quality and clarity of pick up. In voice beamforming applications, this is typically achieved by looking for the direction which contains the most energy.

Since instantaneous estimates (or small frames of speech) are typically noisy, this signal can be smoothed with a low pass filter to stabilize the estimate.

While beam forming offers benefits in single talker pick up, the reality is that the majority of conferences contain multiple talkers who occasionally talk and sometimes talk simultaneously. This greatly impacts the quality of the beamformed signal, often resulting in a person being relatively inaudible for brief periods of time until the beamformer determines a correct course of action.

Beamforming can be seen to have two benefits when considered in a room or reverberant environment. One aspect of beam forming is to improve the isolation of the desired sound to undesired audio and noise coming from other directions. The beam selective process focuses on the desired sound object using the linear combination of the microphones suited to the pattern of signal response that object creates at the microphones.

In addition to noise, a critical problem in rooms and internal spaces is reverberation. This is effectively a later arrival of sound from a wide range of directions at the microphone. In such a situation, there is a direction that can be identified for the early sound energy, and steering a beam in this direction is advantageous as the diffuse reverberant energy is decreased. The ideas behind beamforming for selective source capture, and dereverberation are generally known in the art.

SUMMARY OF THE INVENTION

It is an object of the present invention to provide an improved monitoring of voice conferencing conversations with multiple talkers.

In accordance with a first aspect of the present invention, there is provided a method of processing a series (e.g., set) of microphone inputs of an audio conference, each microphone input being captured by a respective one among an array of microphones, the method including the steps of: (a) conducting a spatial analysis and feature extraction of the audio conference (e.g., of the series of microphone inputs of the audio conference) based on current audio activity, e.g., to obtain information about the approximate relative location of currently active sound objects (e.g., sound objects currently producing sound) relative to the array of microphones; (b) aggregating historical information to obtain information about the approximate relative location of recent sound objects relative to the series of microphone inputs; (c) utilising the relative location or distance of the sound objects from the series of microphone inputs to determine if beam forming should be utilised to enhance the audio reception from recent sound objects. Step (b) may relate to aggregating, e.g., over time, e.g., as historical information, the information about the approximate relative location of currently active sound objects relative to the array of microphones to obtain information about the approximate relative location of recent sound objects (e.g., recently active sound objects) relative to the array of microphones. Step (c) may relate to utilising the relative location of the recent sound objects relative to the array of microphones to determine if beam forming should be (e.g., is to be) utilised to enhance the audio reception from recent sound objects. The sound objects may relate to sound sources.

In some embodiments, the degree of direct to reverberation ratio or the signal coherence can be utilised to estimate the distance of a sound object from the series of microphone inputs. In some embodiments, step (c) preferably can include selectively applying beamforming to objects at an estimated distance of between about 300 and about 3000 mm.

In some embodiments, step (c) further preferably can include selectively applying beamforming to objects with an estimated direct to reverb ratio of between about 10 dB and about 0 dB.

In accordance with a further aspect of the present invention, there is provided a method of processing a series (e.g., set) of microphone inputs of an audio conference, each microphone input being captured by a respective one among an array of microphones, the method including the steps of: (a) conducting a spatial analysis and feature extraction of the audio conference (e.g., of the series of microphone inputs of the audio conference) based on current audio activity, e.g., to obtain information about the approximate relative location of currently active sound objects (e.g., sound objects currently producing sound) relative to the array of microphones; (b) aggregating historical information to retain information about recent sound objects in terms of their optimal microphone beam characteristics and degree of direct to reverb ratio or coherence; and, (c) utilising the recently active objects in the historical context in order to adjust or derate the optimal beam for an active source in such a way as to avoid a null or excessive penalty on the set of likely overlapping or adjacent speaker activity. Step (b) may relate to aggregating, e.g., over time, e.g., as historical information, the information about the approximate relative location of the currently active sound objects relative to the array of microphones to retain (e.g., obtain) information about recent sound objects in terms of their (e.g., optimal) microphone beam characteristics and their degree of direct to reverb ratio or coherence. Step (c) may relate to adjusting, based on the information about the recent sound objects, the optimal beam for an active sound object in such a way as to reduce a suppression of sound capture of currently inactive sound objects (e.g., among the recent sound objects) in case that they become active. In general, the optimal beam may be adjusted to avoid placing nulls towards any others of the recent sound objects.

In accordance with a further aspect of the present invention, there is provided an apparatus for the selective processing of a series of microphone inputs of an audio conference, the apparatus including: a series of microphone inputs (e.g., an array of microphones, each microphone capturing a respective microphone input); a beamformer interconnected to the microphone inputs (e.g., to the array of microphones) for producing a beamformed audio output of the microphone inputs; a first location determination unit for estimating the location of audio objects (e.g., sound objects) detected by the series of microphone inputs; and a beamformer actuation unit, interconnected to the first location determination unit and to the beamformer so as to actuate the beamformer when audio objects (e.g., sound objects) of a predetermined estimated distance range from the series of microphone inputs are detected.

In some embodiments, the beamformer actuation unit optimises the beamforming pattern to reduce the impact on the audio objects located by the first location determination unit, e.g., to reduce an adverse impact on the quality of audio capture of the sound objects located by the first location determination unit.

BRIEF DESCRIPTION OF THE DRAWINGS

Embodiments of the invention will now be described, by way of example only, with reference to the accompanying drawings in which.

DETAILED DESCRIPTION

The embodiments of the invention utilise an optimisation of beamforming to provide for improved reception techniques in multi talking environments. According to embodiments, a series (e.g., set) of microphone inputs is captured, e.g., each microphone input is captured by a respective one among a series (e.g., array) of microphones.

In the case of using beam forming for dereverberation, it has been surprisingly found that there is a delicate balance or trade off depending on the distance of the source from the microphones. For near sound sources, the reverberation at the microphones is already low, and there is only small advantage in beamforming. For far sound sources, the direct sound energy is low, and it becomes increasingly difficult to estimate a stable beam that focuses on the early response, and again beamforming can become less valuable. So, there is a certain intermediate distance, having a range of a 'direct to reverb' ratio for a particular source, where beamforming is more advantageous.

The following two issues and complications can arise with the generic use of beamforming in communications systems: In the case of multiple talkers near the conferencing audio input/output device, a beamformer may cause large changes in the absolute level of each source as it switches to the instantaneously dominant energy signal (direction). This can impede the intelligibility and perceived audio quality of the conversation. In the case of very near and very far audio sources, the value of a beamformer is reduced and is therefore less critical. Thus there is a balance between the benefits of beamforming, and these two issues. Where the benefits of the beamformer are lower, for very near and very distant sources, on balance it may be preferential to not apply any beamforming for such talkers.

In some embodiments, it was found that sources having a direct to reverb ratio in excess of 10 dB did not benefit from beam forming, whilst source with a direct to reverb ration below 0 dB suffered degradation due to beam stability issues estimation error.

Figure 1:
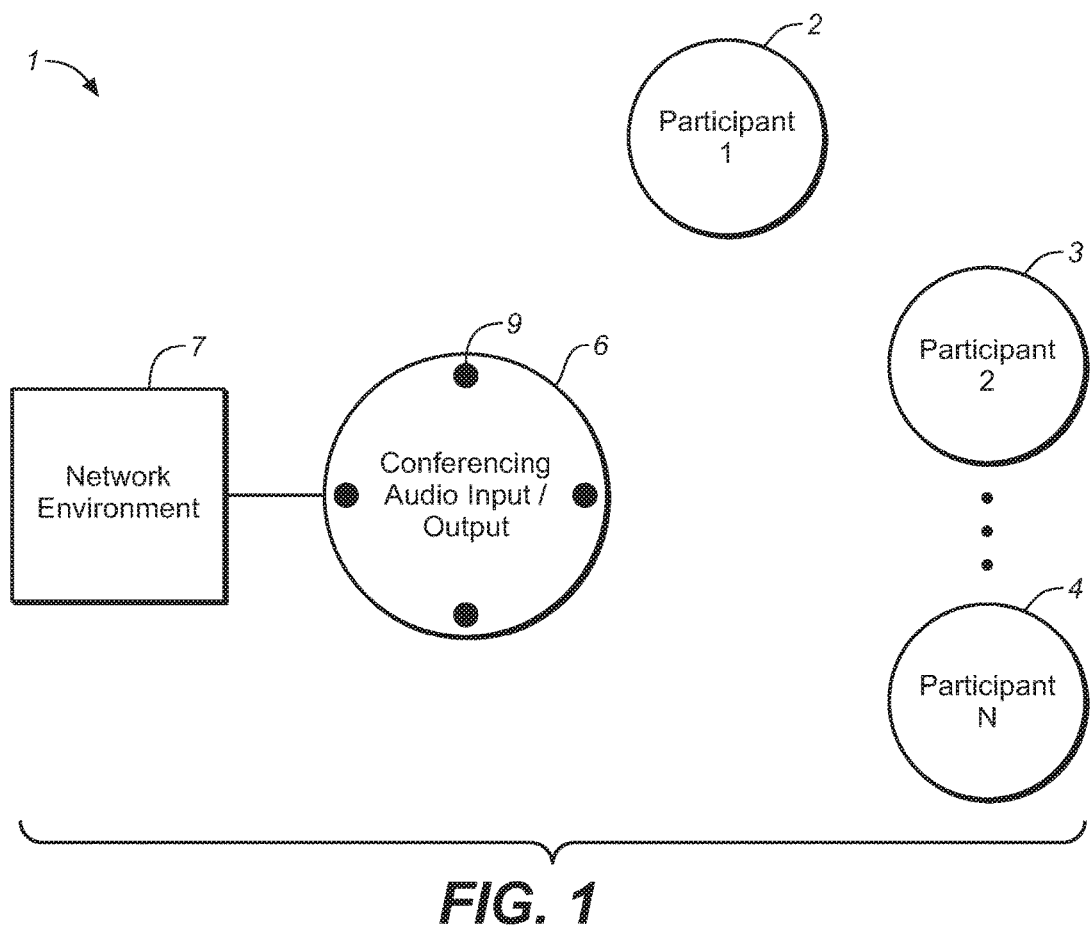
FIG. 1 illustrates schematically an example audio conferencing environment.
Figure 2:
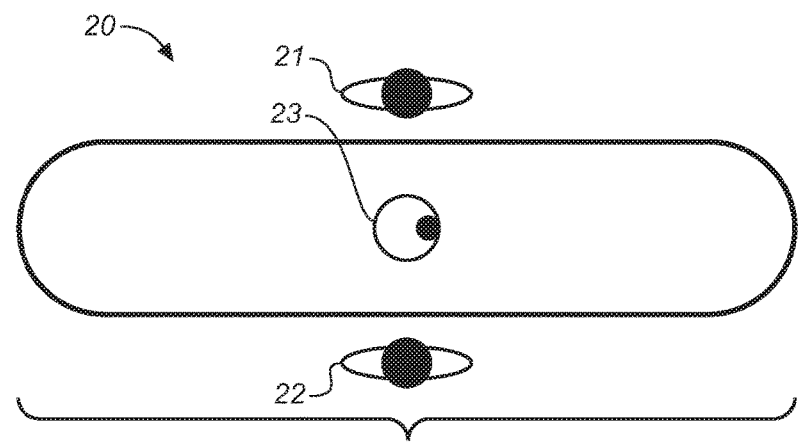
FIG. 2 illustrates schematically a first example conferencing environment.
Figure 3:
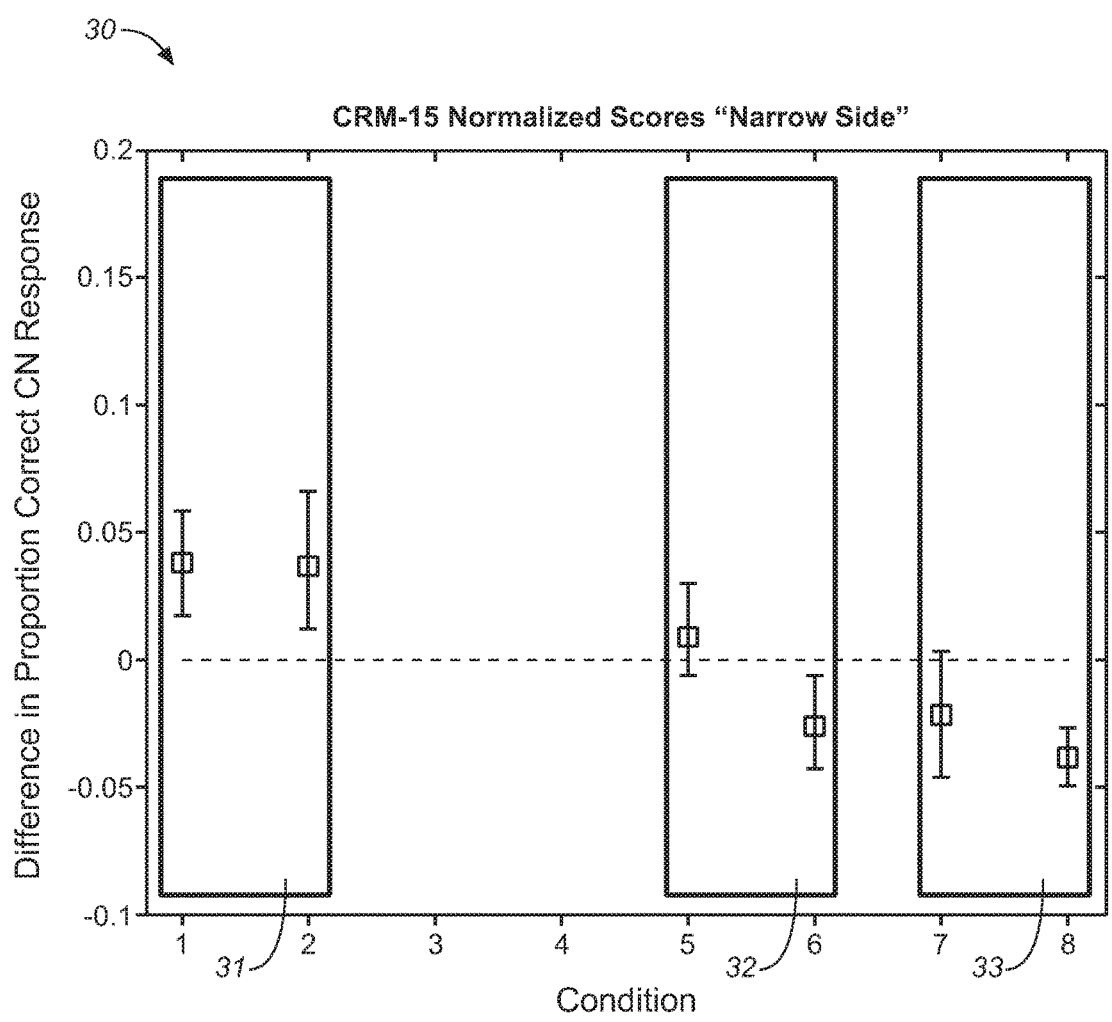
FIG. 3 illustrates a graph of the system performance of the arrangement of FIG. 2.

A number of concurrent speaker intelligibility tests were conducted to determine the complexity of these issues. In a first test, illustrated 20 in FIG. 2, the speakers 21, 22 were placed close to the microphone 23. FIG. 3 illustrates a resulting intelligibility test measure. A first system, 31, which operated without using beamforming, was found to have high intelligibility. Two other systems 32, 33, utilised a form of microphone switching or beam forming. For the case of close seated speakers (FIG. 2), the system was found to perform best without beamforming. This is related to the problematic switching between dominant talkers.

Figure 4:
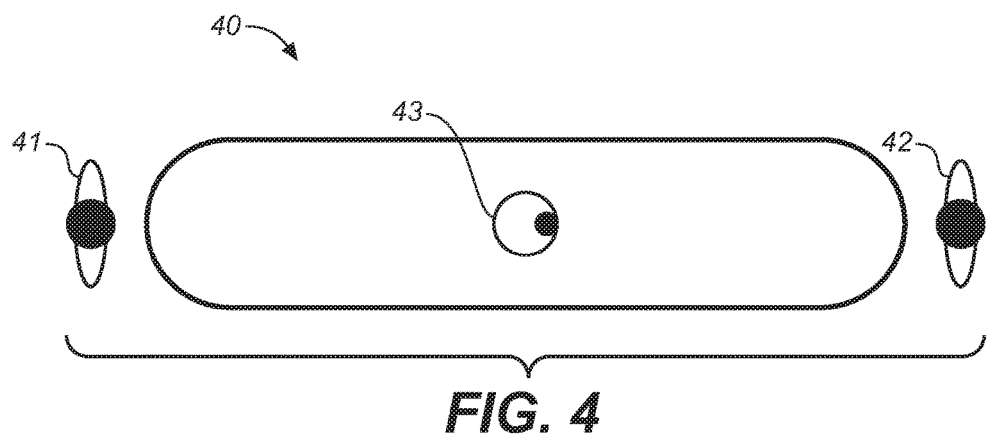
FIG. 4 illustrates schematically a second example conferencing environment.
Figure 5:
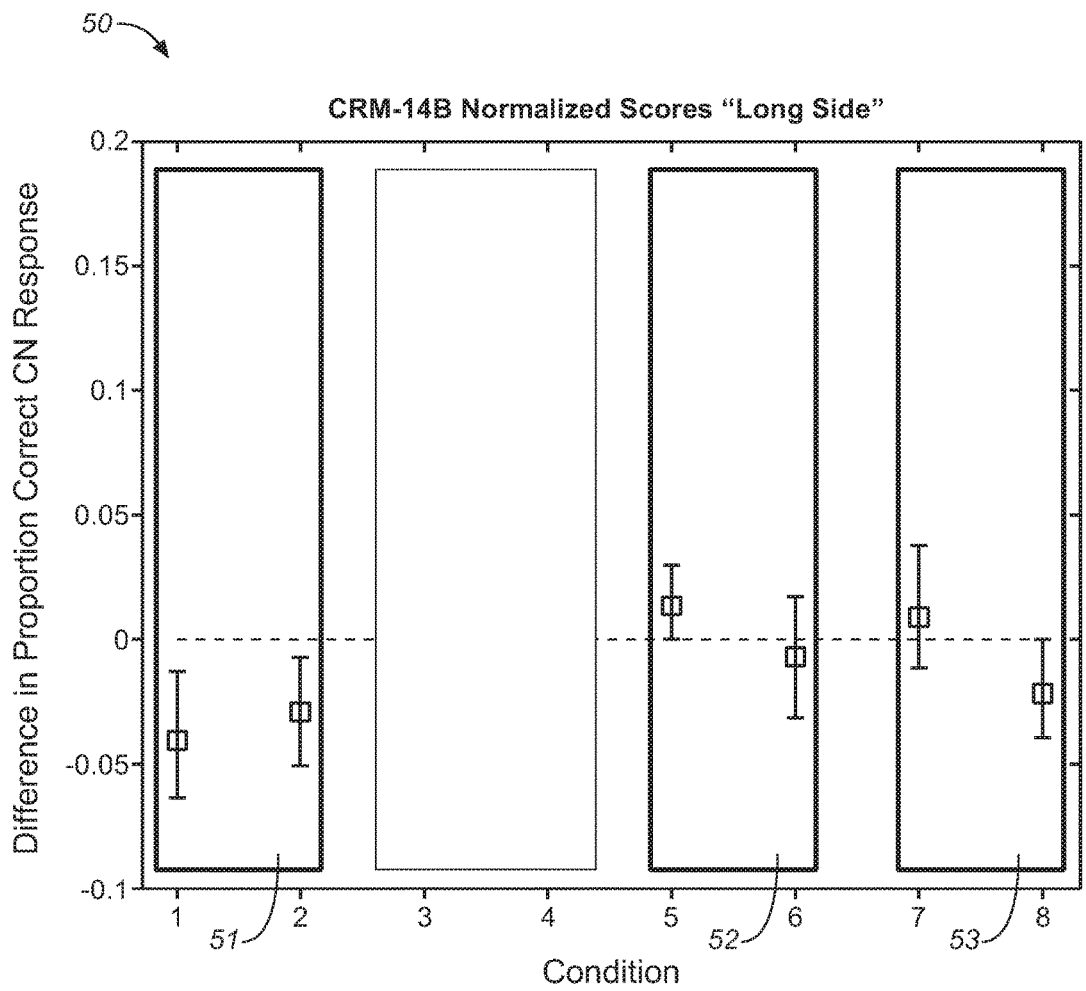
FIG. 5 illustrates a graph of the system performance of the arrangement of FIG. 4.

In a second arrangement, illustrated 40 in FIG. 4, speakers 41, 42, were placed about 2 m from the audio input device 43. FIG. 5 illustrates a resulting intelligibility test measure. In this arrangement, beamforming was found to provide for a significant advantage.

The embodiments therefore utilise beamforming in conjunction with scene analysis to better control the directivity of beams. Further, the beamforming is selectively implemented for appropriate distance sources.

The embodiments of the invention can utilise information in the form of Scene Analysis to attempt to locate the participants around the audio input devices. One form of suitable scene analysis is that disclosed in United States Patent Application Publication US 2014/0241528 entitled "Sound Field Analysis System", assigned to the present applicant, the contents of which are incorporated by cross reference. The suitable form of scene analysis is also disclosed in "On the potential for Scene Analysis from Compact Microphone Arrays", Glenn Dickins, David Gunawan, Dong Shi, AES $52^{nd}$ International Conference, (2013), the contents of which are also incorporated by cross reference. In general, methods and apparatus according to the present disclosure can conduct a spatial analysis and feature extraction of the series of microphone inputs of the audio conference based on current audio activity to thereby obtain information about the approximate relative location of currently active sound objects relative to the array of microphones, This information may relate to a feature space related to the direction and the direct to reverb ratio, or the estimated relevant distance of a source from the microphones.

From the foregoing publications there is the potential for drawing (e.g., determining), from a microphone array, the feature space related to the direction and the direct to reverb ratio, or the estimated relevant distance of a source from the microphones. Also in this work, it is noted the benefit of considering the direction of arrival which is difficult to estimate as the effective distance increases (or direct to reverb ratio decreases).

Figure 6:
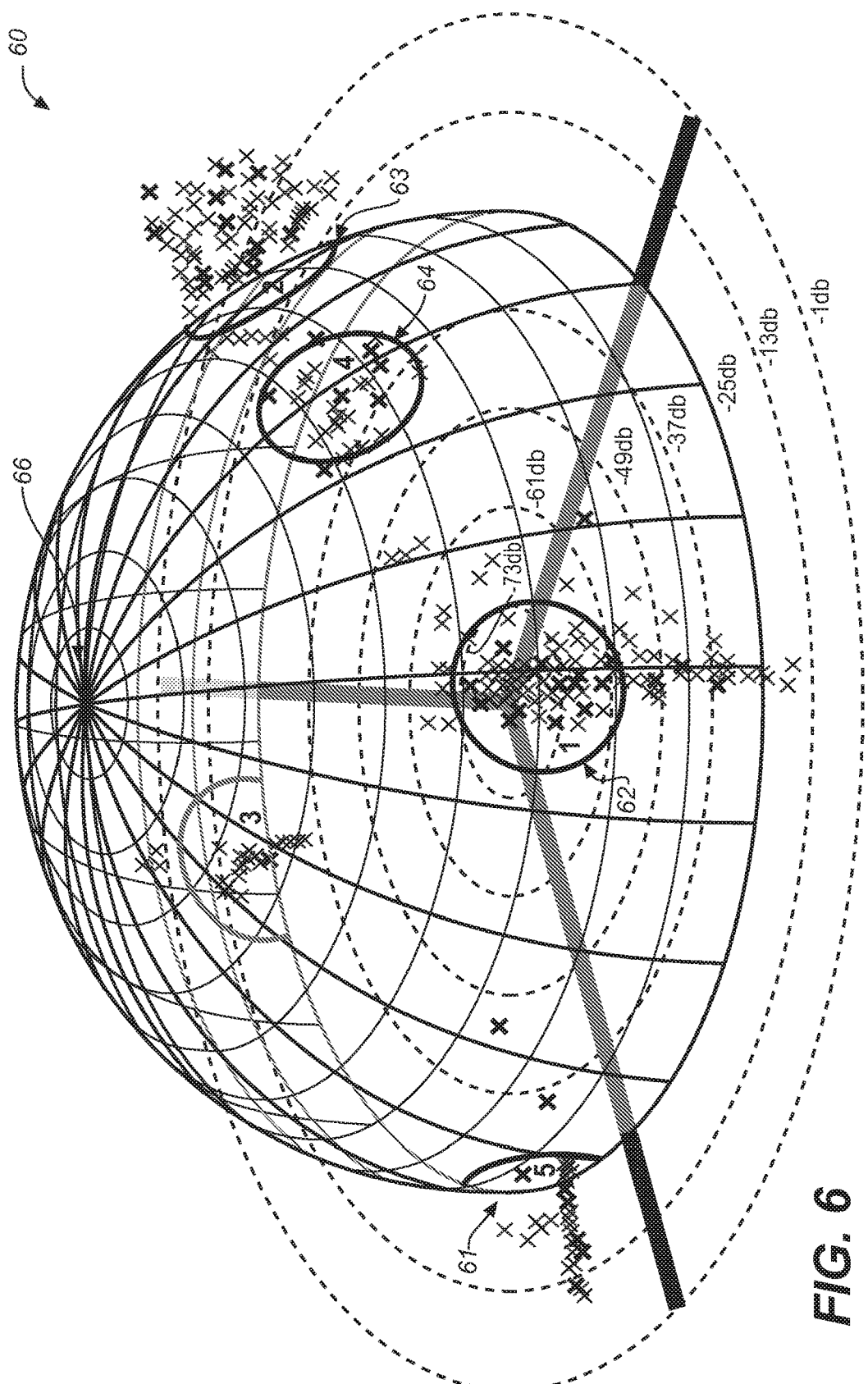
FIG. 6 illustrates the results of a scene analysis technique used with an embodiment.

FIG. 6 illustrates a resulting scene analysis from the techniques outlined in the aforementioned application. The azimuthal angle represents the direction of arrival, and the elevation is related to (e.g., represents) the effective distance or reverberant energy. A resulting series of speaker sources e.g. 61 to 64 was derived from the scene analysis.

Sources which have acoustic features mapping onto points lower on the hemisphere, such as point 61, have a higher direct to reverberant ratio and represent sources close to the device and microphones. Sources having more reverberant energy and therefore harder to identify a dominant direction for are located closer to the top or pole 66 of the hemisphere, such as source 64. In the figure, the difference in uncertainty or angular variation estimation of the source is evident from comparing for example sources 61 and 64. As discussed above, a source such as 61 is close and clear at the microphone and gains little from beam forming. A source such as 62 is intermediate and would be a candidate for enabling beamforming when there is activity of this object, as represented by the detection of audio at the input having spatial features corresponding to the location or elevation on the scene map. In this way, for selective directional noise reduction, beamforming is most effective for sources some distance above the equator and some distance away from the pole, representing a band around the hemisphere. In some embodiments, the selection of beamforming applied to the prime direction may be based on the instantaneous spatial audio features (e.g., based on information about approximate relative locations of currently active sound objects relative to the array of microphones). In other embodiments there may be additional use of historical spatial features to identify a stable cluster location of each source as shown by the circles in FIG. 6. The addition of heuristics or tracking and selective hypothesis filtering in the scene analysis can improve the robustness of the object distance (direct to reverb) estimation and choice of application of the beam former.

In some embodiments, rather than a binary decision to apply beamforming, the system may select to adjust the directivity factor of the beamformer between unity for very near or very far sources and some maximum value for the intermediate distance sources.

The embodiments may also provide a process for optimizing the beamforming pattern at any point in time for sound objects (e.g., participants) in a room based on the statistical probability that they will be the next to become active (e.g., talk), thereby avoiding placing the beamformer nulls in positions that may adversely affect the quality of the capture. That is, an optimal beam may be adjusted to avoid suppression of sound objects (e.g., participants) in the room that are currently not active (e.g., not talking), based on the statistical probability that these sound objects will become active next.

Figure 7:
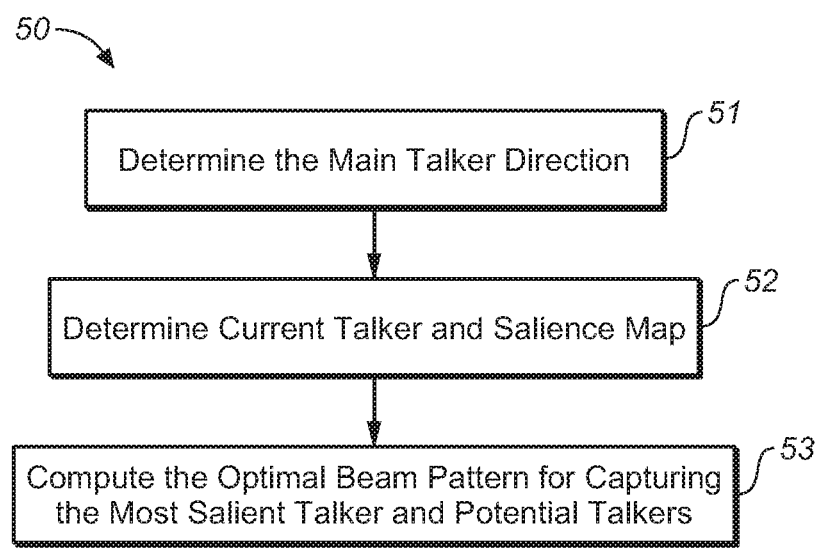
FIG. 7 illustrates a flowchart of the steps of an embodiment.

FIG. 7 illustrates a flow chart of the steps 50 of an embodiment. The embodiments can proceed by the following steps:

1. Determine the Main Talker Direction (51)

Obviously the predominant talker at any point in time is highly likely to be the main talker. So in this step, the main talker direction is determined by analyzing the capture pattern of the microphones (e.g., by scene analysis and/or feature extraction). Ideally the state of the talker is tracked over time and a statistical model of that talker's angle is stored for future use. Mechanisms may be designed to prohibit certain angles to be considered a main talker.

2. Determine the Current Talker and the Salience Map (52)

For the beamformer to know which angles to optimize for, it is necessary to derive a running 'salience' map that describes the weighted importance of each angle for capture. This salience map can be determined by, for any instance of a block of time, the signals from multiple microphones being processed to determine angle of the most salient talker. The salience map is a non-limiting example of information about the approximate relative location of recent sound objects relative to the array of microphones.

Other classifiers may be involved to determine if the signal is a voice signal, room noise or some other form of nuisance. These can all be used to build up a model of all the talkers over the duration of the conference (or even multiple conferences) to improve the system confidence for determining if the current signal contains a talker of interest.

Given the angular information of the current talker is known, a weight can be assigned that is considered the direction of that talker over a certain angular region (e.g. +/−5 degrees).

Next, the completion of the salience map provides an indication of the likelihood or importance of a person talking from a particular angle in the current or subsequent time period. This map may be based on previous verbosity or transition probabilities aggregated over time. Additionally, the map may be designed using an arbitrary mechanism of determining importance (e.g. based on classifiers for nuisances which would deprioritize their weight). The salience map can also be a combination of the two.

Thus the salience map is a comprised of the current talker weighting and the angular likelihood or importance of other talkers.

3. Compute the Optimal Beam Pattern for Capturing the Most Salient Talker and Potential Talkers (53)

Once the salience map is determined, optimal beamformer patterns can be determined. There are obviously limitations on the physical shape of the beam depending on the geometry and number of microphones used and these parameters must be known to determine the range of beams that may be exploited.

An optimal beam pattern can be determined by maximizing the beam amplitude map B, such that:

$$\max\left(\sum_{\theta=0}^{\theta=2\pi} w_\theta B(\theta, \rho)\right)$$

where $w_\theta$ is the salience map for each angle $\theta$, and $\rho$ is the parameterization of the beam pattern.

This effectively ensures that the likelihood of picking up the current talker as well as potential talkers is maximized, reducing the possibility of talkers ending up in a null of the beamformer. In other words, the (optimal) beam for the currently active sound object (e.g., current talker) is adjusted, based on the information about the recent sound objects (e.g., based on the salience map), in such a way as to reduce a suppression of sound capture of currently inactive sound objects (e.g., currently inactive talkers) in case that they become active. This adjustment is based on the statistical probability that currently inactive sound objects become active (e.g., within a predetermined time interval from the present point of time).

Specific Embodiments

In a first example, the audio scene is captured by 3 directional microphones which are configured for first order soundfield capture. The basic microphone layout and responses are shown schematically in FIG. 8. Of course, the proposed technique can also be extended to other topologies that may include additional microphones with different microphones and/or orientation.

The signals from the 3 microphones were time based windowed into 'frames'. They were subsequently transformed into the frequency domain and banded. A covariance matrix was calculated for each frame and smoothed over time. In accordance with the procedures outlined in United States Patent Application Publication US 2014/0241528, the covariance matrix provides the information necessary to extract features for localizing the predominant objects at any time instant and this information is used by higher order logic to determine the location of talkers. In general, a spatial analysis and/or feature extraction is conducted for the microphone signals (e.g., microphone inputs).

This provides the system with information about the approximate relative location of currently active sound objects relative to the array of microphones, e.g., the angular location of each of the potential objects in the room (which could be a talker or a source of noise/nuisance). For each object, information is gathered relating to their angle, average levels, duration of speech activity and duration of non speech activity.

1. Determine the Current Talker and the Salience Map

In one embodiment, at any time instant t, if the estimate of the current dominant angle lies within a standard deviation $\sigma_i$ of the angular statistics of a known talker object i, it is assumed that the current observation is associated with talker i and the mean angle $\mu_i$ of talker i, is set as the main beam angle $\phi$. This angle is taken as the direction that the beam is steered towards. This is allowed to deviate up to $\sigma_1$. The beam steered towards this direction may be referred to as an optimal beam for the talker i. With this information and the historical information of all other objects, a salience map $S(\theta, t)$ can be derived for angle $\theta$ for each time instant t. $S(\theta, t)$ may be derived from the talk activity or verbosity of a particular object such that $$S(\theta, t) = \sum_{j=1}^{J} w_j N(\mu_j, \sigma_j^2)$$

where $N(\mu_j, \sigma_j^2)$ denotes a Gaussian function for each object j classified as a talker such that the characteristics of the Gaussian correspond the angular mean $\mu_j$ and variance $\sigma_j^2$ of the object.

Each Gaussian is scaled by:

$$w_j = \frac{a_j}{\sum_{k=1}^{J} a_k}, j \neq i$$

where $a_j$ is the count of talk frames for object j.

The salience map $S(\theta, t)$ thus is a mixture of Gaussians describing the angular probability a person is talking based on previous observations in a particular conference or aggregated over many conferences.

In other embodiments, the Gaussians may be scaled using various other information such as talker importance (either learnt or provided through user input) or next talker prediction (e.g. previous talker, or utilising Markov models). These methods provide alternative mechanisms for deriving the weighting function $w_j$.

In this particular embodiment, the main beam angle $\phi$ is relatively fixed (within $\sigma_i$), but in an alternate embodiments, the current object could just exist as a higher weighted $w_j$ on the salience map such that $w_i > w_j$, $\forall j \neq i$. This would require the next step to calculate both the optimal beam and the optimal angle. So for computational simplicity, the main beam angle $\phi$ is fixed and the optimal beam pattern calculated.

Figure 8:
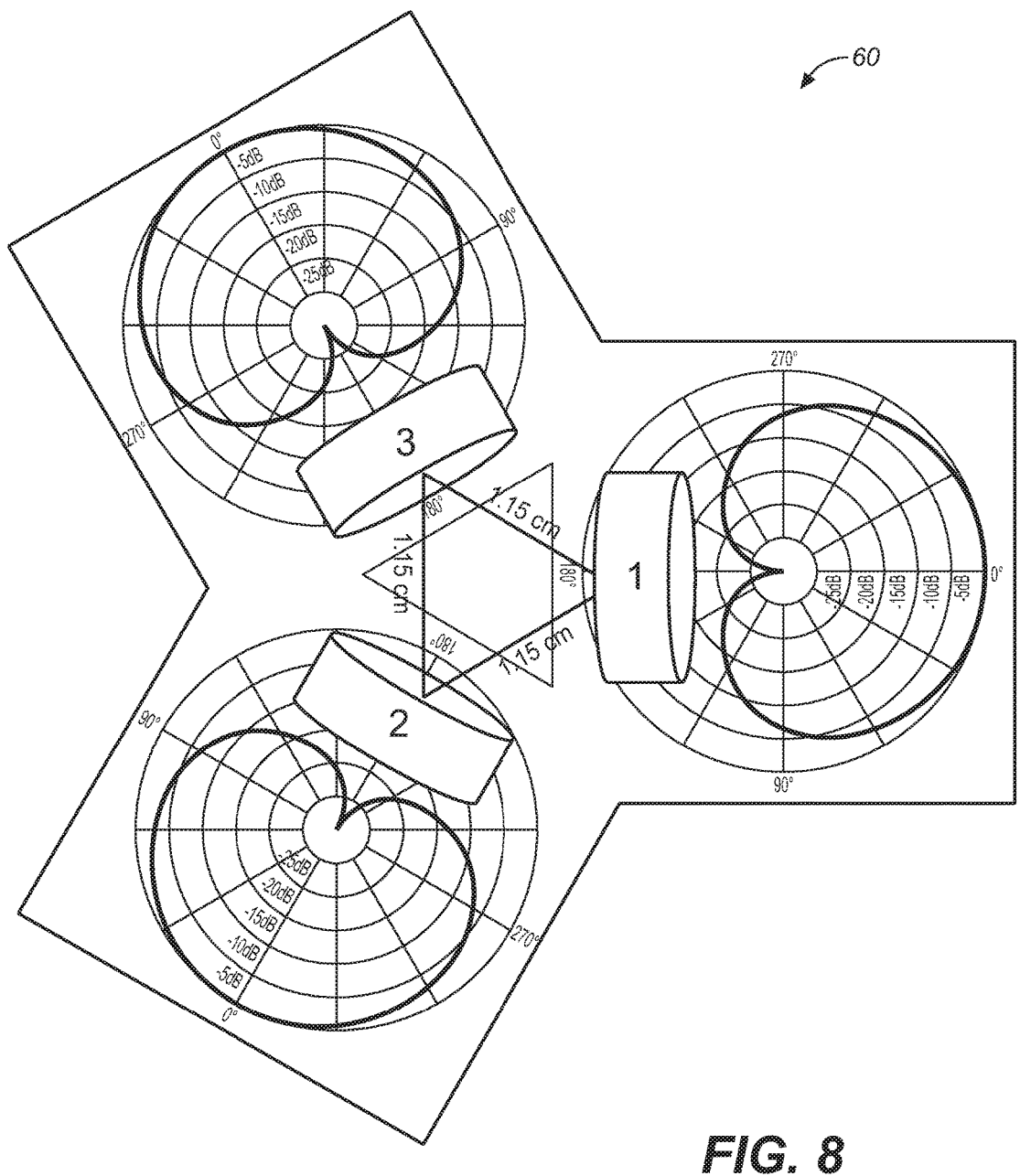
FIG. 8 illustrates an example of the response of three microphones.

2. Compute the Optimal Beam Pattern for Capturing the Most Salient Talker and Potential Talkers Once the salience map $S(\theta, t)$ has been determined, a beam pattern optimization can then be calculated. For the given 3 microphone array of FIG. 8, a variety of beams are possible which can be represented in the polar representation:

$$r(\theta) = \beta + (1-\beta)\cos(\theta - \phi)$$

where r is the amplitude at a given $\theta$, and varying the beam parameter $\beta \in [0,1]$ varies the beam from a FIG. 8 pattern ($\beta = 0$) through to cardioid pattern ($\beta = 0.5$) through to omnidirectional pattern ($\beta = 1$).

The optimal beam pattern can be determined using the main beam angle $\phi$, the salience map $S(\theta, t)$, and the beam pattern equation $r(\theta)$. For a given $\phi$, it is desirable to find the optimal $\beta$ to maximize the inner product of the salience map and the beam pattern equation:

$$\operatorname*{argmax}_{\beta \in [0, 0.5]} \left\{ \sum_{\forall \theta} S(\theta, t) r(\theta) \right\}$$

For maximum noise rejection, $\beta$ can be limited to $\beta\epsilon[0, 0.5]$ so that only FIG. 8 to cardioid patterns are allowed. This may be solved for $\beta$ iteratively or with a closed form solution.

Selection of Beamforming Strength Based on Effective Distance

Figure 9:
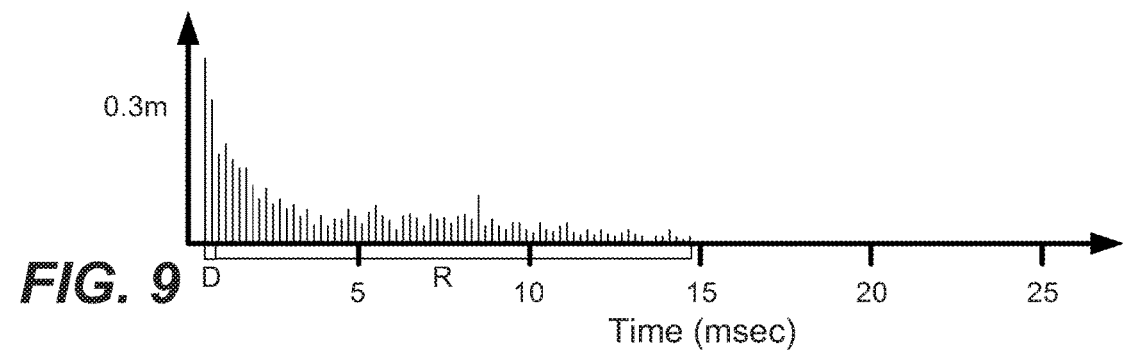
FIG. 9 illustrates an example microphone response of a closely spaced speaker.
Figure 10:
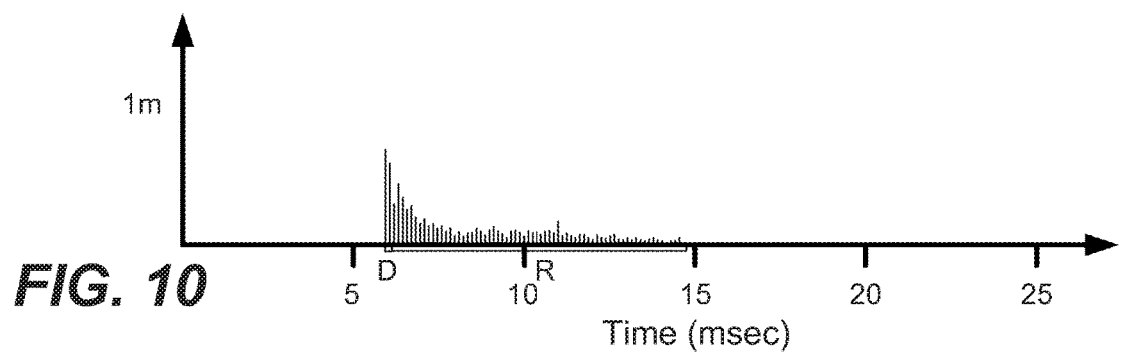
FIG. 10 illustrates an example microphone response of a speaker at about 1 meter.
Figure 11:
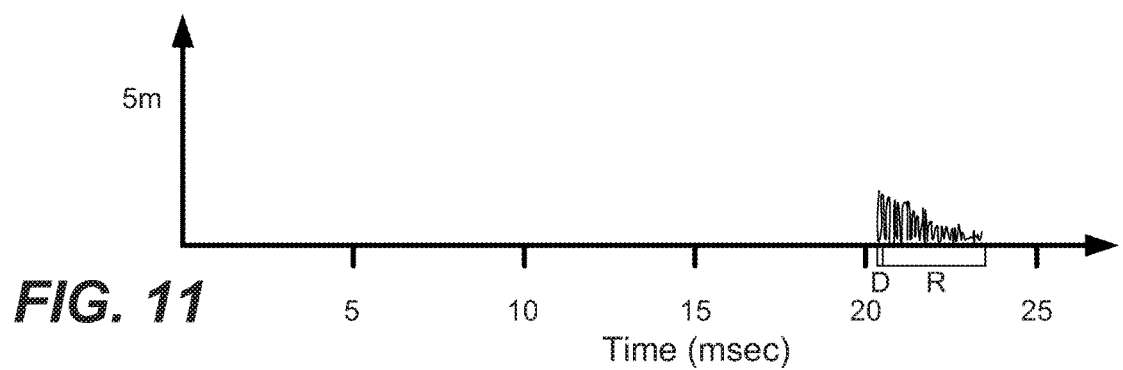
FIG. 11 illustrates an example microphone response of a speaker at about 5 meters.

Consider the typical estimated acoustic response in a room for different distances of source emitter as shown in FIG. 9 to FIG. 11. FIG. 9 illustrates a response when the source is at about 0.3 m, FIG. 10 illustrates a typical response when the source is at about 1 m, and FIG. 11 illustrates a typical response from a distance of about 5 m. The vertical axis represents energy, and the horizontal axis time of arrival, three different distances of sources are shown. It can be seen that sources further away have lower initial signal level at the microphones and more reverberant energy. It has been found that sources further away may not be improved from beamforming with a limited number of microphones as the signal to noise ratio degrades, making beam direction estimation difficult, and even the ideal beam may contain significant reverberation already.

As set out in the aforementioned patent specification, using coherence or alternatively using other techniques based on the power spectrum decay rate over time, the scene analysis is able to estimate the direct to reverb ratio, or related distance of each source (e.g., each source in the salience map). In this way, beamforming can be applied when there is a sound object of interest at a moderate distance (FIG. 10).

Specific Embodiments

In its simplest form, for a single active source, and with a system having three closely spaced cardioid microphones, the method can proceed as follows:

1. If there is only one recent active source, and the direct to reverb ratio is greater than 0 dB, then select the microphone having the largest signal. This is a common case where there is a single user of the system such as on a desk, in a small room, or with limited interaction from the room such as a presenter nearby the device.

2. If there is more than one recent active source within a reasonable time of, for example 5 minutes or since the start of the call, and no sources have a direct to reverb ratio<10 dB, then do not apply any microphone selection. This is the case of multiple speakers sitting close or around the device such as in a small room with significant interaction.

3. If there is one or more recent active source with direct to reverb ratio<10 dB and >0 dB, then apply beamforming such that a beam is instantaneously steered to the active source, and where applicable this beam may be optimized to avoid placing nulls directly towards any other recently active sources with 0-10 dB direct to reverb ratio range.

4. If there is a multiplicity of sources, some of which have direct to reverb ratios<0 dB or >10 dB then enable selective beamforming only when the moderate distance sources are active (0-10 dB DRR). When sources are >10 dB DRR or <0 dB no beamforming is applied. For sources that are <0 dB DRR, then do not apply beamforming when active, and do not include such sources in the saliency map for optimizing any other beams.

Figure 12:
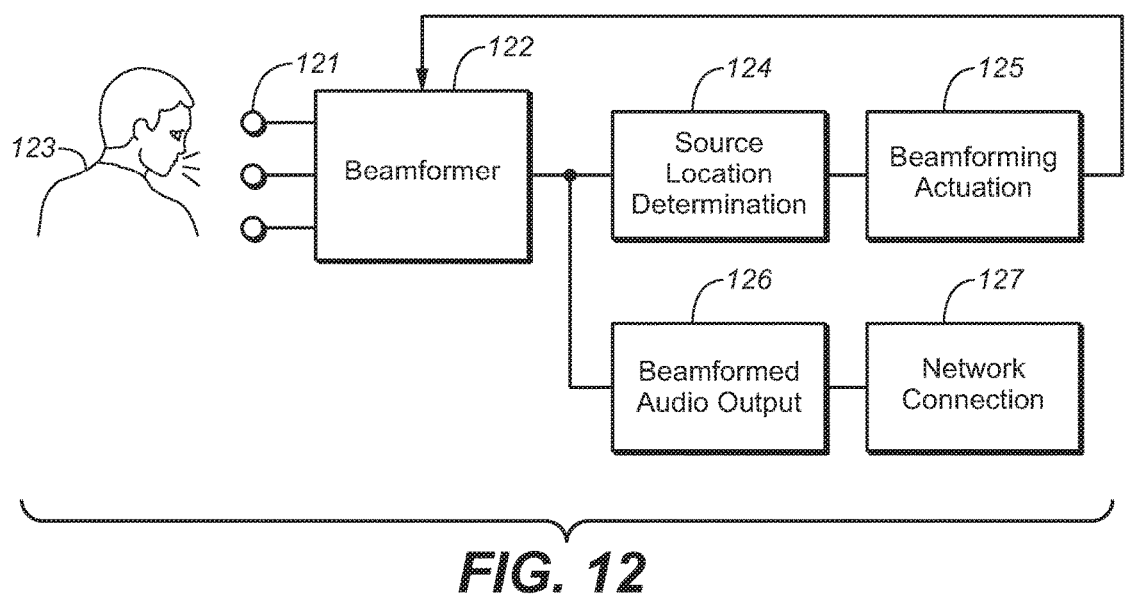
FIG. 12 illustrates schematically an example system of a system for implementation of the embodiments.

An example form of hardware/software implementation is illustrated 120 in FIG. 12. In this arrangement, microphone inputs 121 are input and sampled by beamformer 122. The audio is output to source location determination unit 124. The source location determination unit implements the source analysis of FIG. 6 estimating the radial and distance location of any source 123 of audio. These details are then passed to beam forming actuation unit 125 which determined whether beamforming should be implemented and of what form, given the distance and radial direction of sources. The beamforming parameters are passed back to beamformer 122 to process the audio inputs. The beamformed output is also copied to beamformed audio output unit 126 where it is further output as required.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Computational Implementation

It will be evident to those skilled in the art of implementing audio digital signal processing systems that the components of the system may be a hardware module or a software unit module. For example, in some embodiments, the system may be implemented partially or completely with software and/or firmware, for example, implemented as a computer program product embodied in a computer readable medium. Alternatively or additionally, the system 800 may be implemented partially or completely based on hardware, for example, as an integrated circuit (IC), an application-specific integrated circuit (ASIC), a system on chip (SOC), a digital signal processor (DSP, a field programmable gate array (FPGA), and so forth. The scope of the present invention is not limited in this regard.

Specifically, in accordance with the example embodiments disclosed herein, the processes described above may be implemented as computer software programs. For example, example embodiments disclosed herein comprise a computer program product including a computer program tangibly embodied on a machine readable medium, the computer program including program code for performing methods 100. In such embodiments, the computer program may be downloaded and mounted from the network via a communication section, and/or installed from a removable medium 911.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed among one or more remote computers or servers.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

What is claimed is:

1. A method of processing a series of microphone inputs of an audio conference, each microphone input being captured by a respective one among an array of microphones, the method including the steps of:
   (a) conducting a spatial analysis and feature extraction of the series of microphone inputs of the audio conference based on current audio activity to obtain information about the approximate relative location of currently active sound objects relative to the array of microphones;
   (b) aggregating the information about the approximate relative location of currently active sound objects relative to the array of microphones over time to obtain information about the approximate relative location of recent sound objects relative to the array of microphones; and
   (c) utilising the approximate relative location of the recent sound objects relative to the array of microphones to determine whether beam forming is to be utilised to enhance the audio reception from recent sound objects when these recent sound objects are detected,
   wherein it is determined that beam forming is to be utilized to enhance the audio reception from the recent sound objects when recent sound objects of a predetermined estimated distance range from the array of microphones are detected.

2. The method as claimed in claim 1, wherein step (b) includes aggregating approximate locations of currently active sound objects over time and determining clusters of locations among the aggregated approximate locations.

3. A method as claimed in claim 1, wherein a degree of direct to reverberation ratio or a signal coherence is utilised to estimate the distance of a sound object from the series of microphone inputs.

4. A method as claimed in claim 1, wherein step (c) includes selectively applying beamforming to sound objects among the recent sound objects at an estimated distance of between 300 and 3000 mm.

5. A method as claimed in claim 1, wherein step (c) further includes selectively applying beamforming to sound objects among the recent sound objects with an estimated direct to reverb ratio of between 10 dB and 0 dB.

6. A method of processing a series of microphone inputs of an audio conference, each microphone input being captured by a respective one among an array of microphones, the method including the steps of:
   (a) conducting a spatial analysis and feature extraction of the series of microphone inputs of the audio conference based on current audio activity to obtain information about the approximate relative location of currently active sound objects relative to the array of microphones;
   (b) aggregating the information about the approximate relative location of currently active sound objects relative to the array of microphones over time to obtain information about recent sound objects in terms of their optimal microphone beam characteristics and their degree of direct to reverb ratio or coherence; and
   (c) adjusting, based on the information about the recent sound objects, an optimal microphone beam for an active sound object in such a way as to reduce a suppression of sound capture of currently inactive sound objects in case that they become active,
   wherein the optimal microphone beam for the active sound object is adjusted so as to avoid a null or suppression above a given threshold for currently inactive sound objects that are likely to become active.

7. The method as claimed in claim 6, wherein an optimal microphone beam for a recent sound object is chosen so as to maximize the beam amplitude for the recent sound object.

8. The method as claimed in claim 6, wherein the likelihood that currently inactive sound objects will become active is estimated based on a statistical analysis of the information about recent sound objects.

9. An apparatus for the selective processing of a series of microphone inputs of an audio conference, the apparatus including:
   an array of microphones, each microphone capturing a respective microphone input;
   a beamformer interconnected to the array of microphones for producing a beamformed audio output of the microphone inputs;
   a location determination unit for estimating the location of sound objects detected by the series of microphone inputs, wherein estimating the location of sound objects involves conducting a spatial analysis and feature extraction of the microphone inputs of the audio conference based on current audio activity to obtain information about the approximate relative location of currently active sound objects relative to the array of microphones; and
   a beamformer actuation unit, interconnected to said location determination unit and to said beamformer, for actuating the beamformer,
   wherein the beamformer actuation unit is adapted to:
   aggregate the information about the approximate relative location of currently active sound objects relative to the array of microphones over time to obtain information about the approximate relative location of recent sound objects relative to the array of microphones; and
   utilise the approximate relative location of the recent sound objects relative to the array of microphones to determine whether beam forming is to be utilised to enhance the audio reception from recent sound objects when these recent sound objects are detected; and
   determining that beam forming is to be utilized to enhance the audio reception from the recent sound objects when recent sound objects of a predetermined estimated distance range from the array of microphones are detected.

10. An apparatus as claimed in claim 9, wherein aggregating the information about the approximate relative location of currently active sound objects relative to the array of microphones over time includes aggregating approximate locations of currently active sound objects over time and determining clusters of locations among the aggregated approximate locations.

11. An apparatus as claimed in claim 9, wherein a degree of direct to reverberation ratio or a signal coherence is utilised to estimate the distance of a sound object from the series of microphone inputs.

12. An apparatus as claimed in claim 9, wherein utilising the approximate relative location of the recent sound objects relative to the array of microphones includes selectively applying beamforming to sound objects among the recent sound objects at an estimated distance of between 300 and 3000 mm.

13. An apparatus as claimed in claim 9, wherein utilising the approximate relative location of the recent sound objects relative to the array of microphones further includes selectively applying beamforming to sound objects among the recent sound objects with an estimated direct to reverb ratio of between 10 dB and 0 dB.

14. An apparatus for the selective processing of a series of microphone inputs of an audio conference, the apparatus including:
an array of microphones, each microphone capturing a respective microphone input;
a beamformer interconnected to the array of microphones for producing a beamformed audio output of the microphone inputs;
a location determination unit for estimating the location of sound objects detected by the series of microphone inputs, wherein estimating the location of sound objects involves conducting a spatial analysis and feature extraction of the microphone inputs of the audio conference based on current audio activity to obtain information about the approximate relative location of currently active sound objects relative to the array of microphones; and
a beamformer actuation unit, interconnected to said location determination unit and to said beamformer, for actuating the beamformer,
wherein the beamformer actuation unit is adapted to:
aggregate the information about the approximate relative location of currently active sound objects relative to the array of microphones over time to obtain information about recent sound objects in terms of their optimal microphone beam characteristics and their degree of direct to reverb ratio or coherence;
adjust, based on the information about the recent sound objects, an optimal microphone beam for an active sound object in such a way as to reduce a suppression of sound capture of currently inactive sound objects in case that they become active; and
adjusting the optimal microphone beam for the active sound object so as to avoid a null or suppression above a given threshold for currently inactive sound objects that are likely to become active.

15. An apparatus as claimed in claim 14, wherein an optimal microphone beam for a recent sound object is chosen so as to maximize the beam amplitude for the recent sound object.

16. An apparatus as claimed in claim 14, wherein the likelihood that currently inactive sound objects will become active is estimated based on a statistical analysis of the information about recent sound objects.

* * * * *